Patented June 30, 1942

2,288,335

UNITED STATES PATENT OFFICE 2,288,335

SYNTHETIC ACROLEIN

Hans Walter, Frankfort-on-the-Main, and Hermann Schulz, Neu-Isenburg, Germany, assignors to Deutsche Gold-und Silber-Scheideanstalt vormals Roessler, Frankfort-on-the-Main, Germany, a German company No Drawing. Application August 30, 1939, Serial No. 292,609. In Germany September 14, 1938

19 Claims. (Cl. 260—604)

The present invention relates to a process for producing acrolein.

Heretofore it has been general practice to produce acrolein by heating glycerine in the presence of water-withdrawing substances, such as anhydrous magnesium sulfate. For several reasons the acrolein so produced did not find wide use in industry.

It has now been discovered that acrolein can be produced in a very simple and economical manner by reacting acetylene with formaldehyde.

It is an object of the present invention to provide a process for producing acrolein from acetylene and formaldehyde.

It is another object of the present invention to provide a process for producing acrolein by the reaction of acetylene with formaldehyde in the liquid or vapor phase.

It is a further object of the present invention to provide a process for producing acrolein by reacting acetylene with formaldehyde in the liquid or vapor phase in the presence of catalysts.

The present invention likewise contemplates the provision of a process for producing acrolein by reacting acetylene with formaldehyde in which the reaction temperature is controlled by admixing diluting gases or vapors.

Other objects and advantages will become apparent from the following description.

Broadly speaking, the reaction of acetylene and formaldehyde may be carried out in the liquid phase or in the vapor phase with or without catalysts. However, we prefer to react acetylene with formaldehyde in the vapor phase. This reaction is facilitated by use of catalysts. The reaction in the liquid phase is likewise facilitated by the use of catalysts. As catalysts in the liquid phase reaction process mineral acids especially sulfuric acid, phosphoric acid, benzene sulfonic acid, or zinc chloride solutions, may be employed. These acids also may be employed in addition with catalytic heavy metal compounds or heavy metal salts, such as copper, copper phosphate, silver, iron oxide. It is also possible to employ mercury salts, e. g., mercuric sulfate, mercuric phosphate which advantageously are dissolved in an excess of the same acid, e. g. in an excess of sulfuric acid.

Quite satisfactory results have been obtained when the reaction of acetylene and formaldehyde is carried out in the gaseous or vapor phase. Thus, a mixture containing formaldehyde and acetylene is conducted over a stationary catalyst at elevated temperature above about 150° C. We prefer, however, to conduct the reaction at temperatures of about 180° C. to about 300° C. The reaction is accompanied by the development of substantial amounts of heat, and it is advisable to make provision for the removal of excess reaction heat. This can be accomplished in several ways, for example, the contact space may be indirectly cooled in a suitable manner or the contact walls may be so cooled. An advantageous manner of controlling the reaction temperature is that of admixing diluting gases or vapors with the reaction components. Such gases or vapors may be nitrogen, carbon dioxide, carbon monoxide, steam, or an excess of acetylene.

The catalyst may be present as a mass constituted solely of the catalytic material, or the catalytic material may be supported on suitable material. As catalyst supports materials having large adsorptive surfaces or large surfaces having adsorbing properties, such as activated carbon, activated clay, or preferably activated silicic acid, are particularly suitable for this purpose. We have found that metallic, salt-like or oxidic substances may be employed as catalysts. As an illustrative list of the materials typical of the catalysts we have found suitable for facilitating the reaction of acetylene with formaldehyde to produce acrolein, the following is provided. The metals zinc, silver, copper, cadmium, tungsten, manganese, iron, nickel and cobalt have all given satisfactory results. We have also found that the oxides, hydroxides and carbonates of the alkali, alkaline earth and earth metals and rare earths likewise are suitable for use as catalysts in this reaction. It is also possible to employ the acid or alkaline phosphates, the chlorides, borates, acetates, silicates and the like of the aforesaid elements. Furthermore, the aforesaid materials may be employed individually or in any desired admixture with each other as catalysts.

While the quantities of reacting substances may be selected practically at will, it is preferable to avoid an excess of formaldehyde. Very good results have been obtained when employing mixtures which contained acetylene and formaldehyde in equimolecular proportions or in proportions differing slightly therefrom. On the other hand, good results have been obtained also when employing an excess of acetylene wherein the excess of acetylene was utilized for carrying away the heat of reaction.

Other factors also affect the reaction. Thus, it is necessary to select a throughput velocity which is not too low. In the event that the throughput velocity is too low, the yield is reduced and the catalyst is prematurely poisoned.

It has been found that throughput velocities not much less than about 0.2 mol of formaldehyde per liter of catalyst per hour give satisfactory results. On the other hand, very good results are obtained with a throughput velocity of about 5 mols of formaldehyde per liter of catalyst mass per hour. However, under certain conditions it is advantageous to increase the throughput velocity even above these values. This is especially true in view of the advantage in withdrawing the excess reaction heat in this manner.

The formaldehyde may be employed in its commercially obtainable form as an aqueous solution, or it may be employed in its water-free condition such as is obtained particularly by vaporizing paraformaldehyde. The acetylene may be employed undiluted or diluted with hydrogen or methane such as is obtained in the cracking of methane. The reaction may also be carried out at subatmospheric or superatmospheric pressure as well as at atmospheric pressure.

In order that those skilled in the art may appreciate the results obtained by employing the principles of the present invention, the following illustrative example is provided.

The vapors of 40% formaldehyde in mixture with excess acetylene were conducted over a catalyst at a temperature of about 200° C. to 250° C. The catalyst was constituted of activated silicic acid impregnated with sodium silicate and zinc phosphate in an amount of about 10% of its weight. The throughput velocity was adjusted to about 1 mol of formaldehyde per liter of catalyst mass per hour. The vapor mixture resulting therefrom was condensed and treated in a manner known to those skilled in the art to obtain acrolein. A good yield of acrolein was obtained.

Generally speaking, the catalysts have a satisfactory life. When the activity of the catalysts decreases, they can be readily regenerated by treating them with oxygen-containing gases at elevated temperatures. Furthermore, it is advantageous to purify the acetylene by removing the sulfur- or phosphorus-containing impurities by conventional means well known to those skilled in the art.

Although the present invention has been described in conjunction with preferred embodiments thereof, it is to be understood that variations and modifications can be made as those skilled in the art will readily appreciate. Such variations and modifications are to be considered within the purview of the foregoing specification and the scope of the appended claims.

We claim:

1. A process for producing acrolein which comprises reacting acetylene with formaldehyde in the vapor phase in the presence of a condensation catalyst at temperatures above 150° C.

2. A process for producing acrolein which comprises reacting acetylene with formaldehyde in the presence of at least one condensation catalyst at temperatures above 150° C.

3. A process for producing acrolein which comprises reacting acetylene with formaldehyde in the gaseous phase in the presence of at least one condensation catalyst at elevated temperatures.

4. A process for producing acrolein which comprises reacting acetylene with formaldehyde in the gaseous phase in the presence of condensation catalysts comprising soluble inorganic salts at temperatures of about 180° C. to about 300° C.

5. A process for producing acrolein which comprises reacting acetylene with formaldehyde in the gaseous phase in the presence of condensation catalysts comprising soluble inorganic salts at temperatures of about 200° C. to about 250° C.

6. A process for producing acrolein which comprises reacting an excess of acetylene with formaldehyde in the presence of condensation catalysts at temperatures above 150° C.

7. A process for producing acrolein which comprises reacting acetylene with formaldehyde in the gaseous phase in the presence of condensation catalysts and diluent vapors at temperatures above 150° C.

8. A process for producing acrolein which comprises reacting acetylene with formaldehyde in the presence of a condensation catalyst comprising a soluble inorganic salt at elevated temperatures and maintaining a reaction temperature of about 150° C. to about 300° C. by indirectly cooling the contact space.

9. A process for producing acrolein which comprises reacting acetylene with formaldehyde in the presence of a condensation catalyst comprising a soluble inorganic salt at elevated temperatures and maintaining a reaction temperature of about 150° C. to about 300° C. by admixing diluent fluids selected from the group consisting of nitrogen, carbon dioxide, carbon monoxide and water vapor.

10. A process for producing acrolein which comprises reacting acetylene with formaldehyde at elevated temperatures in the presence of a condensation catalyst comprising a soluble inorganic salt and maintaining a reaction temperature of about 150° C. to about 300° C. by admixing an excess of acetylene.

11. A process for producing acrolein which comprises reacting acetylene and formaldehyde in about equimolecular proportions at elevated temperatures and maintaining a reaction temperature of about 150° C. to about 300° C. by indirectly cooling the reaction chamber.

12. A process for producing acrolein which comprises reacting acetylene substantially devoid of compounds containing substances selected from the group consisting of phosphorus and sulfur with formaldehyde in about equimolecular proportions at temperatures of about 150° C. to about 300° C.

13. A process for producing acrolein which comprises reacting acetylene with formaldehyde at temperatures above 150° C. and maintaining a throughput velocity of at least not much less than about 0.2 mol of formaldehyde per liter of catalyst mass per hour, said catalyst being a condensation catalyst comprising a soluble inorganic salt.

14. A process for producing acrolein which comprises reacting a mixture of formaldehyde and acetylene in a proportion containing at least 1 mol of acetylene per mol of formaldehyde at temperatures above 150° C.

15. A process for producing acrolein which comprises reacting a mixture of formaldehyde and acetylene in a proportion containing at least 1 mol of acetylene per mol of formaldehyde at temperatures above 150° C. in the presence of a condensation catalyst.

16. A process for producing acrolein which comprises conducting a vaporous mixture containing formaldehyde and acetylene over a condensation catalyst comprising sodium silicate and zinc phosphate at a temperature of about 200° C. to about 250° C.

17. A process for producing acrolein which comprises conducting a vaporous mixture containing formaldehyde and acetylene over a condensation catalyst comprising sodium silicate and zinc phosphate at a temperature of about 200° C. to about 250° C. at a throughput velocity of about 1 mol of formaldehyde per liter of catalyst mass per hour.

18. A process for producing acrolein which comprises passing the vapors of 40% formaldehyde in mixture with excess acetylene over a catalyst mass comprising activated silicic acid impregnated with sodium silicate and zinc phosphate at a temperature of about 200° C. to about 250° C. at a through-put velocity of about 1 mol of formaldehyde per liter of catalyst mass per hour.

19. A process for producing acrolein which comprises passing vapors of formaldehyde in mixture with excess acetylene over a catalyst mass comprising activated silicic acid impregnated with about 10% of its weight of sodium silicate and zinc phosphate at a temperature of about 200° C. to about 250° C. at a through-put velocity of about 1 mol of formaldehyde per liter of catalyst mass per hour.

HANS WALTER.
HERMANN SCHULZ.